Sept. 11, 1956     T. E. DUFFEY     2,762,158

INSECTICIDE APPLICATOR

Filed Dec. 28, 1953

INVENTOR

Thomas E. Duffey

BY Bailey, Stephens & Huettig

ATTORNEYS

United States Patent Office 2,762,158
Patented Sept. 11, 1956

2,762,158
INSECTICIDE APPLICATOR

Thomas Edward Duffey, West Palm Beach, Fla., assignor, by mesne assignments, to Pet Products, Incorporated, West Palm Beach, Fla.

Application December 28, 1953, Serial No. 400,453

5 Claims. (Cl. 43—145)

This invention relates to an insecticide applicator. In particular, the invention is directed to a device for readily applying an insecticide to an animal, such as a pet dog.

An object of the invention is to provide an insecticide in a form by which it can be manually applied to a pet, such as a dog. Another object of the invention is to produce a formula which is effective both for the extermination of pest life and for the relief of skin irritations on an animal, and to package such composition so that it may readily and manually be applied to the animal.

In general, these objects are obtained by combining certain chemicals, such as methoxychlor and dichlorophene and other chemicals which are effective in controlling ticks and fleas and certain types of fungus infection such as ringworm and summer eczema. This compound is contained in a bag forming a part of a mitt adapted to being placed on the hand of the person applying the compound. The bag portion of the mitt has a porous palm member through which the compound is dusted as the mitt is rubbed and patted on the animal.

The means by which these and other objects of the invention are obtained are described more fully with respect to the accompanying drawings, in which.

Figure 1:
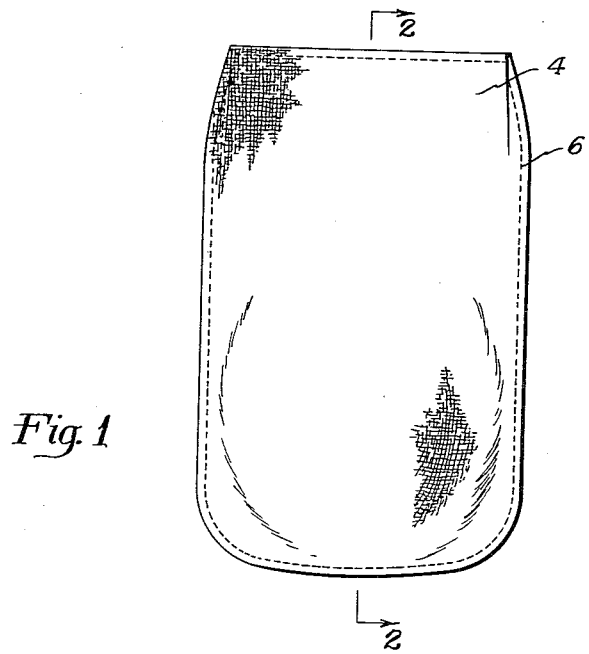
Figure 1 is a front view of the applicator.
Figure 2:
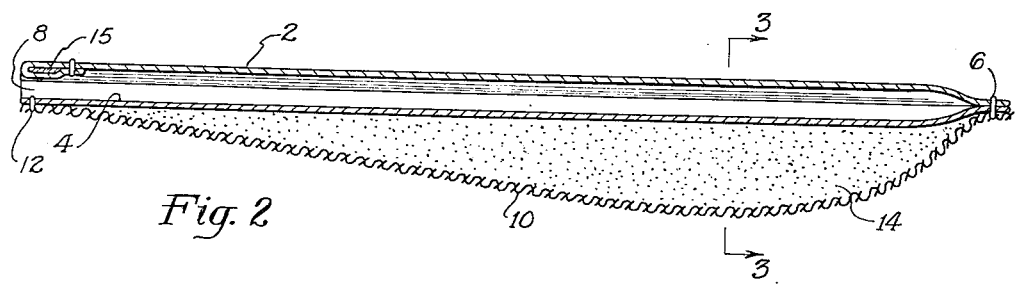
Figure 2 is an enlarged cross-sectional view on the line 2—2 of the Figure 1.
Figure 3:
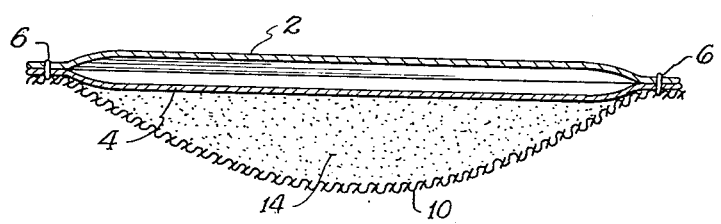
Figure 3 is an enlarged cross-sectional view of the line 3—3 of Figure 2.

The applicator is composed of a piece of cloth 2 forming the back of the mitt, united to a palm-covering piece of cloth 4 by stitches 6. These stitches extend around three sides of the rectangular pieces of cloth, leaving an open end 8 into which a hand can be inserted, thus forming a thumbless mitt. The pieces of cloth 2 and 4 are preferably formed of a relatively inexpensive textile, such as gingham.

The palm piece 4 has united thereto a bag forming member 10 which on three sides is united to member 4 by the stitches 6, and on the rear end further united only to member 4 by stitches 12. An elastic band 15 is sewed around opening 8. In the pocket formed between members 4 and 6 is inserted, prior to the stitching at 12, a powder mixture of chemicals 14. Member 10 is preferably formed of a relatively porous material, such as flannel, although such other materials such as terry cloth may be used. Flannel preferably is used because it permits dusting without an excess of dust filtering through and being wasted. As the gingham is more firmly woven than the flannel or terry cloth, the powdered chemicals will not pass through the gingham into the space between cloth pieces 2 and 4.

The composition 14 is an insecticide, or a mixture of insecticides and other ingredients which will exterminate ticks, fleas and the like. Ingredients are incorporated to control fungus infection such as ringworm, and types of alternaria sometimes associated with "summer eczema." An example of such a combination of chemicals is as follows:

| | Percent |
|---|---|
| Methoxychlor technical [1] | 5.00 |
| Technical piperonyl cyclonene [2] | 2.00 |
| Pyrethrins | 2.00 |
| Rotenone | .20 |
| Other cube resins [3] | 1.00 |
| Methylenebischlorophenol | 2.00 |
| Inert ingredients | 88.80 |
| | 100.00 |

[1] Equivalent to 4.4% 2,2-bis (p-methoxyphenyl) 1,1,1-trichloroethane and .6% other isomers and reaction products.
[2] Equivalent to 1.6% of 3-isoamyl-5-(methylenedioxyphenyl)-2-cyclohexenone and its 6-carbethoxy derivative and 0.4% of related compounds.
[3] Cube resins as chemicals incorporated in rotenone extracts, and constituting inert materials for practical purposes.

In operation the hand of the user of the mitt is slipped between layers 2 and 4 with the palm covering the layer 4. The animal, such as a dog, is dusted by patting and rubbing the dog with the cloth member 10. The chemical composition filters through this porous layer onto the dog. The animal should be rubbed and patted well down to the skin, starting at the head and working rearwardly, being sure to include the feet and legs. The powder will kill fleas and ticks and serve to eliminate skin irritations.

Having now described the means by which the objects of the invention are obtained, I claim:

1. An insecticide applicator comprising two substantially rectangular pieces of cloth sewn together to form a thumbless mitt, a third piece of cloth sewn onto said mitt to form a bag, and an insecticide powder in the bag.

2. An applicator as in claim 1, further comprising said third piece of cloth being coextensive with said two pieces of cloth.

3. An applicator as in claim 1, said insecticide further comprising a mixture of methoxychlor, dichlorophene and insert materials.

4. An applicator as in claim 1, said insecticide further comprising methoxychlor, piperonyl cyclonene, pyrethrin, rotenone, cube resins, methylenebischlorophenol, and inert material.

5. An applicator as in claim 1, said two pieces of cloth further comprising finely woven material substantially impervious to the passage therethrough of said insecticide powder, and said third piece of cloth taken from the class consisting of flannel and terry cloth and being pervious to the passage of said insecticide.

References Cited in the file of this patent
UNITED STATES PATENTS

| Re. 23,341 | Wachs | Feb. 13, 1951 |
| 133,634 | Danziger | Dec. 3, 1872 |
| 1,105,364 | McKay | July 28, 1914 |
| 1,621,240 | Dennis | Mar. 15, 1927 |
| 1,713,065 | Williams | May 14, 1929 |
| 1,928,256 | Jones | Sept. 26, 1933 |

OTHER REFERENCES

Brown, A. W. A. "Insect Control by Chemicals," published 1951 by John Wiley & Sons, New York, pages 26–27, 668.

Marsh, Butler, and Clark: "Fungicidal Activity of the Bisphenols," pages 2176–2183 of vol. 41, No. 10, October 1949 issue of Industrial and Engineering Chemistry.